(12) United States Patent
Schulak

(10) Patent No.: US 6,467,298 B2
(45) Date of Patent: Oct. 22, 2002

(54) ENERGY TRANSFER SYSTEMS FOR REFRIGERATOR/FREEZER COMPONENTS

(76) Inventor: Edward R. Schulak, 567 Aspen, Birmingham, MI (US) 48009

( * ) Notice: Subject to any disclaimer, the term of this patent is extended or adjusted under 35 U.S.C. 154(b) by 0 days.

(21) Appl. No.: 10/116,145

(22) Filed: Apr. 3, 2002

(65) Prior Publication Data

US 2002/0108393 A1 Aug. 15, 2002

Related U.S. Application Data

(63) Continuation of application No. 09/844,732, filed on Apr. 30, 2001, which is a continuation-in-part of application No. 09/356,754, filed on Jul. 19, 1999, now Pat. No. 6,230,514, which is a continuation of application No. 09/183,743, filed on Oct. 30, 1998, now Pat. No. 5,964,101, which is a continuation-in-part of application No. 09/126,143, filed on Jul. 30, 1998, now Pat. No. 5,937,662, which is a division of application No. 08/927,232, filed on Sep. 10, 1997, now Pat. No. 5,816,063, which is a continuation-in-part of application No. 08/761,329, filed on Dec. 10, 1996, now Pat. No. 5,666,817.

(51) Int. Cl.[7] ............................ F25D 11/00; F25D 23/12
(52) U.S. Cl. ................................... 62/440; 62/260
(58) Field of Search .................. 62/238.6, 440, 62/441, 238.7, 236, 260; 165/45

(56) References Cited

U.S. PATENT DOCUMENTS

| | | | | | |
|---|---|---|---|---|---|
| 4,111,259 A | * | 9/1978 | Lebduska | ............... | 237/71 A |
| 4,171,721 A | * | 10/1979 | Movick | ............... | 165/45 |
| 4,735,064 A | * | 4/1988 | Fischer | ............... | 62/430 |

FOREIGN PATENT DOCUMENTS

| | | | | | |
|---|---|---|---|---|---|
| JP | 57-43137 | * | 3/1982 | ............... | 62/260 |
| JP | 58-31237 | * | 2/1983 | ............... | 126/585 |
| JP | 4-366372 | * | 6/1991 | ............... | 62/260 |
| JP | 5-118700 | * | 10/1991 | ............... | 165/45 |

* cited by examiner

Primary Examiner—Denise L. Esquivel
Assistant Examiner—Melvin Jones
(74) Attorney, Agent, or Firm—Harness, Dickey & Pierce, P.L.C.

(57) ABSTRACT

An energy transfer system is provided for a household or commercial refrigeration appliance. The energy transfer system includes a fluid passage disposed in the housing of the appliance for enabling the transfer of a fluid into, through, and out of the housing. The fluid is circulated through a heat exchanger which can be disposed outside of a home or commercial building or underground so that the fluid is cooled by the outside air or by the ground. The fluid may also be groundwater that is circulated throughout the system in a semi-open loop arrangement. The cooling fluid is also utilized to cool the compressor of an air conditioning unit. A heat exchanger is also utilized for transferring heat from the cooling fluid to an interior of a building.

6 Claims, 12 Drawing Sheets

ENERGY TRANSFER SYSTEMS FOR REFRIGERATOR/FREEZER COMPONENTS

CROSS REFERENCE TO RELATED APPLICATIONS

This is a continuation of U.S. patent application Ser. No. 09/844,732, filed Apr. 30, 2001 which is a continuation in part of U.S. patent application Ser. No. 09/356,754, filed Jul. 19, 1999, now U.S. Pat. No. 6,230,514, which is a continuation of Ser. No. 09/183,743, filed Oct. 30, 1998, now U.S. Pat. No. 5,964,101, which is a continuation-in-part of U.S. patent application Ser. No. 09/126,143, filed Jul. 30, 1998, now U.S. Pat. No. 5,937,662, which is a division of U.S. patent application Ser. No. 08/927,232, filed Sep. 10, 1997, now U.S. Pat. No. 5,816,063, which is a continuation-in-part of U.S patent application Ser. No. 08/761,329 filed Dec. 10, 1996, now U.S. Pat. No. 5,666,817.

FIELD OF THE INVENTION

The present invention relates to domestic and/or commercial refrigerators and freezers. More particularly, the present invention relates to a system and method for utilizing cool outdoor ambient temperature levels to reduce the energy required to operate a domestic and/or commercial refrigerator or freezer system.

BACKGROUND AND SUMMARY OF THE INVENTION

Virtually every home and apartment in this country has at least one refrigerator for storing perishable food products. Additionally, many households also have a freezer for storing food products over extended periods of time. As a consequence of such widespread usage, these domestic appliances consume a substantial part of the electrical energy which is generated by the nation's utility companies. In this regard, it should be noted that despite recent strides, refrigerators are still only half as efficient as the theoretical limit allowed by its use of the Reverse Carnot Cycle. Consequently, opportunity still exists to substantially increase the energy efficiency of domestic refrigeration appliances. Since even the newest refrigerators consume approximately 700 kwh of electricity per year, it should be understood that a substantial need still exists to increase the energy efficiency of domestic refrigeration appliances.

In addition, the cost of operating commercial refrigeration systems constitutes a substantial portion of the overhead expenses of the perishable food distribution industry. A reduction of the operating costs would likely translate into increased profit margins as well as a reduction in consumer prices.

Accordingly, it is a principle objective of the present invention to provide a system and method which reduces the energy required to operate domestic and/or commercial refrigerator and freezer systems.

It is also known in the air conditioning industry that an air conditioning system can operate more efficiently if the compressor of the air conditioning system is appropriately cooled.

Thus, it is a further object of the present invention to provide a system and method of cooling the compressor of an air conditioning system.

The cost of heating a grocery store during the winter months can also be very substantial. The use of open refrigeration cabinets within the store greatly increases the amount of heating that is required in order to keep shoppers comfortable. Typically, there is a large amount of heat that is generated by the refrigeration components such as the compressor and condenser. This heat is typically vented out of the building. Accordingly, it is an object of the present invention to utilize the heat generated by the refrigeration components to aid in heating a building.

These and other objects of the present invention are obtained by providing a refrigeration system including a housing defining a cooling storage compartment. Refrigeration means are provided for cooling the cooling storage compartment. The refrigeration means includes a compressor and a condenser. A cooling passage is provided for carrying cooling fluid for cooling at least one component of the refrigeration means. A storage vessel is disposed external of the housing for containing the cooling fluid. The storage vessel may be a groundwater source such as an open loop well. The cooling passage is connected to the storage vessel. Pumping means are provided for moving the cooling fluid through the fluid passage in order to cool the at least one component of the refrigeration means. A heat exchanger is disposed in the cooling passage, and a fan is provided for blowing air at said heat exchanger for transferring heat from said cooling fluid to an interior of a building.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
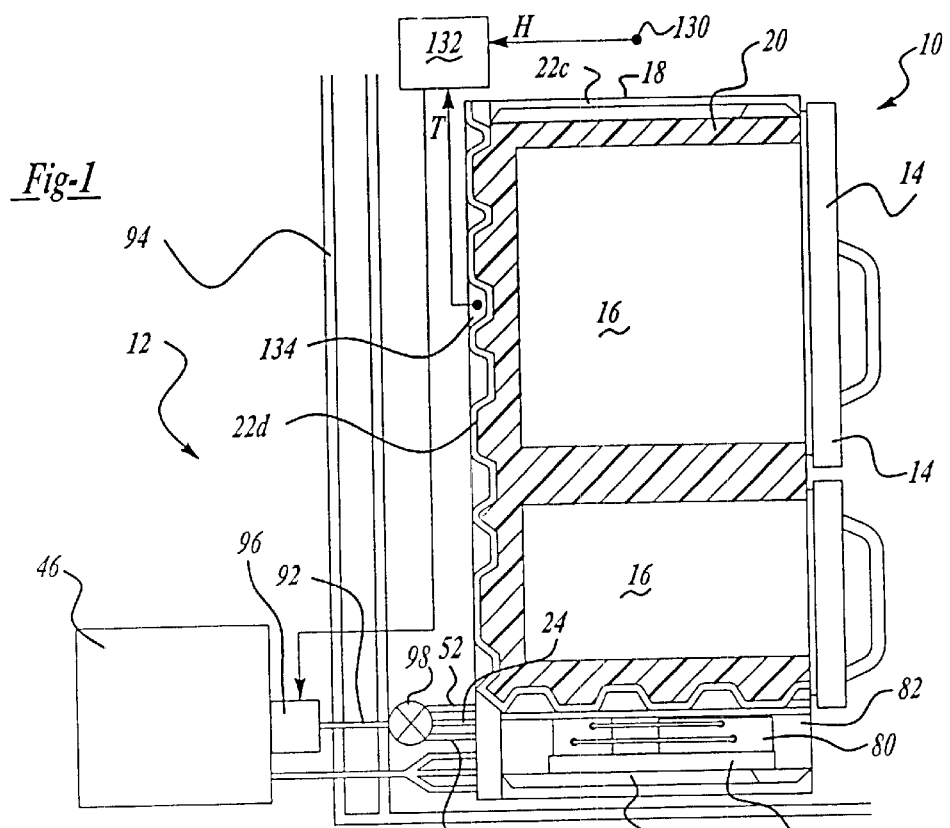
FIG. 1 is a schematic view of a household refrigeration appliance in accordance with a first embodiment of the present invention.

As shown in FIG. 1, the refrigerator 10 generally includes at least one door 14 across its front to enable access to cooling storage compartments 16. In FIG. 1, two cooling storage compartments 16 and two doors 14 are shown.

Refrigerator 10 includes a housing 18 which surrounds the cooling storage compartments 16. Insulating material 20 is provided around each of the cooling storage compartments 16. According to a preferred embodiment of the present invention, a plurality of rollbond panels 22a–22e are disposed in the rear wall, side walls, upper wall, and lower wall of the housing 18. The rollbond panels 22a, 22b provided in the side walls of the housing 18 as well as the rollbond panel 22c provided in the upper wall of housing 18, include a serpentine passage 23 which connects a first inlet 24 to a first outlet 26.

Figure 2:
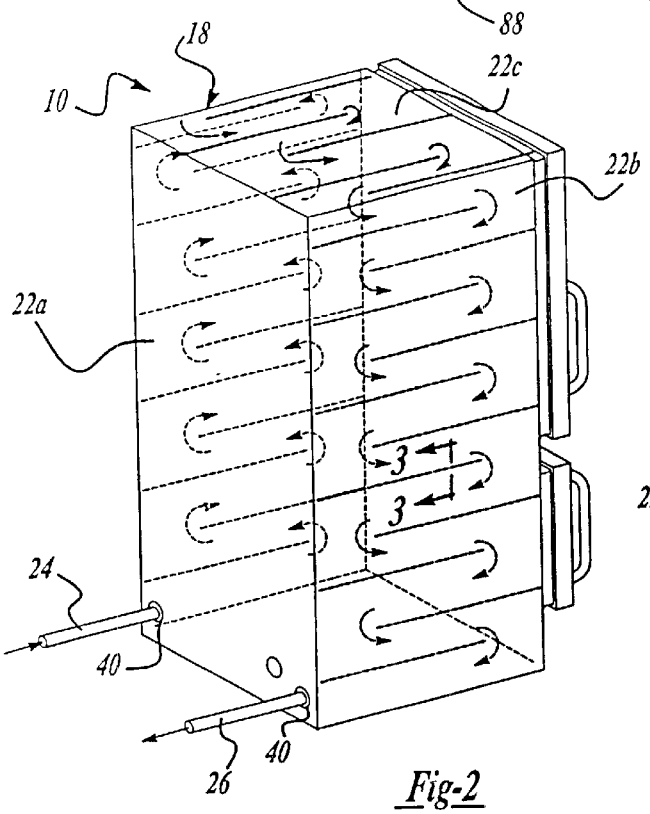
FIG. 2 is a perspective view of the refrigerator shown in FIG. 1, illustrating the fluid passages disposed in the side walls and top of the refrigerator housing.
Figure 3:
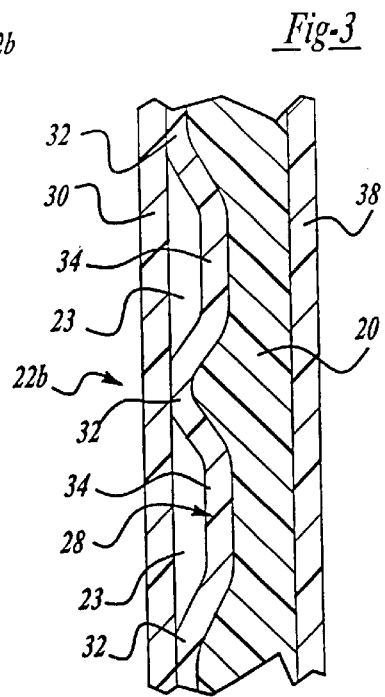
FIG. 3 is a cross-sectional view of an insulated rollbond panel according to the principles of the present invention.

As shown in FIG. 3, the rollbond panels 22a–22c include a formed plate 28 attached to a generally flat plate 30. The formed plate 28 is preferably a heat conducting metal such as aluminum. Formed plate 28 includes a plurality of connecting portions 32 which are bonded to generally flat plate 30. Formed plate 28 also includes a plurality of passage defining portions 34 which define the fluid passages 23 which are preferably defined in a serpentine fashion as shown in FIG. 2. The formed plate members 28 are bonded to the generally flat plate 30 at contact portions 32 by welding, adhesives, or other known bonding techniques. The insulating material 20, such as foam, can be injected between the rollbond panel and the liner 38 of the cooling storage compartments 16.

The rollbond panels 22a–22c can be integrally formed and then bent into the inverted Ushape shown in FIG. 2. Alternatively, panels 22a–22c can be independently formed and then connected to one another using sufficient seals for connection therebetween so that a continuous fluid passage 23 is provided between inlet 24 and outlet 26. Inlet 24 and outlet 26 are generally tubular shaped conduits which communicate with passages 23 and are provided with a seal 40 around an annular surface thereof.

Inlet 24 and outlet 26 communicate with heat exchanger 46 of energy transfer system 12. Heat exchanger 46 can be provided with cooling fins and/or a fan in order to facilitate cooling of the fluid circulating therein.

Figure 4:
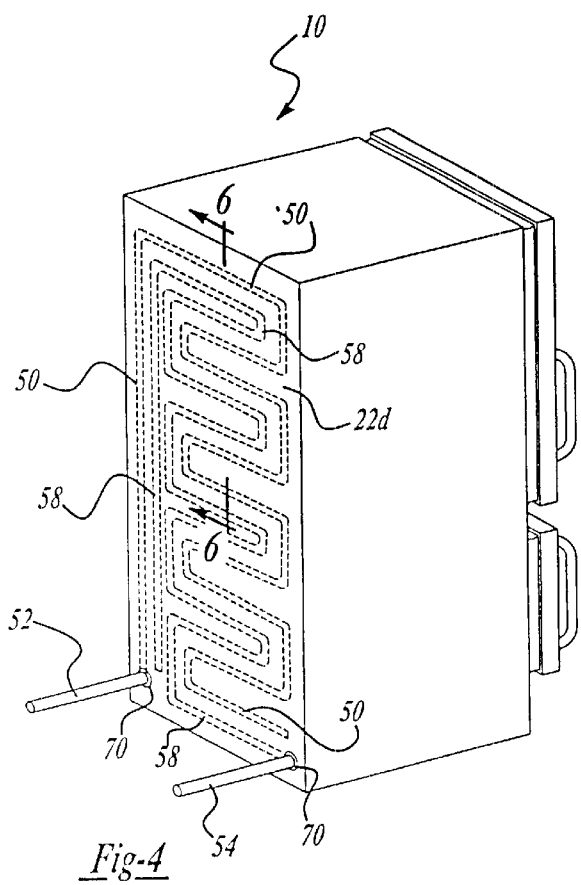
FIG. 4 is a perspective view of the refrigerator shown in FIG. 1, illustrating the serpentine fluid passages along with the condenser passages disposed in the rear wall of the refrigerator or freezer according to the present invention.
Figure 6:
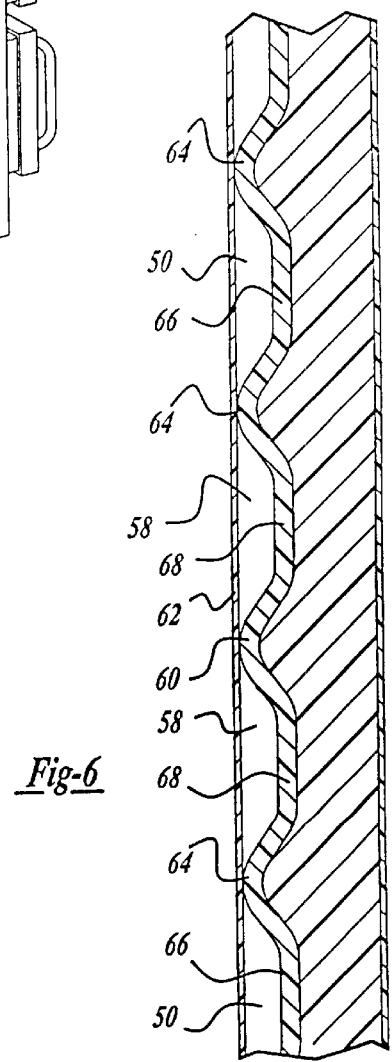
FIG. 6 is a cross-sectional view taken along line 6—6 of FIG. 4.

The rear wall of the refrigerator 10 is provided with a rollbond panel 22d as shown in FIG. 4. Rollbond panel 22d includes a first fluid passage 50 which communicates with inlet 52 and outlet 54. Inlet 52 and outlet 54 communicate with heat exchanger 46 of energy transfer system 12. A condenser passage 58 is disposed adjacent to fluid passage 50. Fluid passage 50 and condenser passage 58 are each preferably formed in a serpentine fashion as shown in FIG. 4. With reference to FIG. 6, the fluid passage 50 and condenser passage 58 are defined by a formed plate member 60 which is bonded to generally flat plate member 62 by connecting portions 64. Formed plate member 60 is preferably a heat conducting metal sheet such as aluminum and includes fluid passage defining portions 66 and condenser forming portions 68. The inlet 52 and outlet 54 are generally formed from conduits which are connected to the inlet and outlet ends of fluid passage 50. Annular seals 70 are provided around the annular surface of the conduits 52, 54 to connect the conduits 52, 54 to the fluid passage 50.

Figure 5:
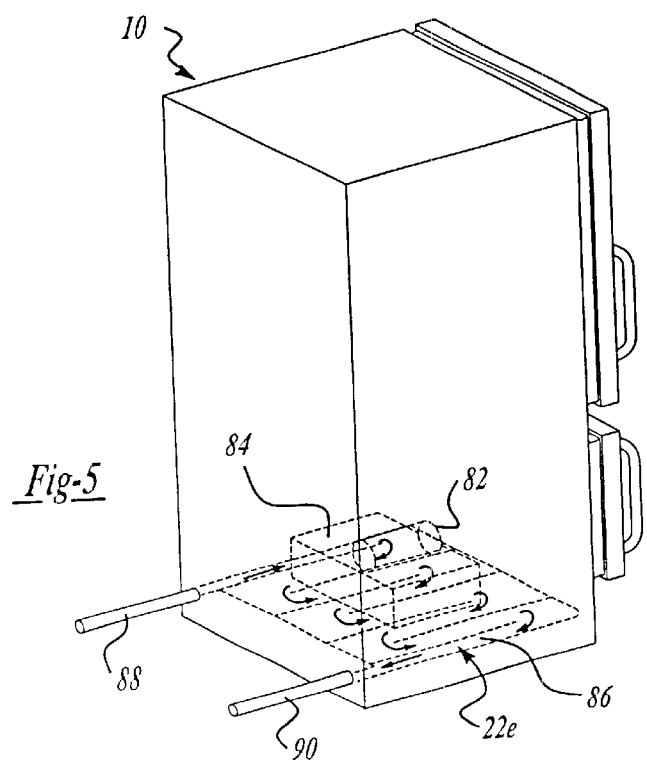
FIG. 5 is a perspective view of the refrigerator shown in FIG. 1, illustrating the fluid passages disposed in the bottom portion of the refrigerator for cooling the compressor.

With reference to FIG. 1, the refrigeration mechanism of refrigerator 10 includes a compressor 80 which is disposed in a compartment 82 provided in a bottom portion of the refrigerator 10. Compressor 80 is disposed adjacent to rollbond panel 22e. Compressor 80 preferably includes an oil cooling system including an oil sump 84 adjacent to rollbond panel 22e. Energy transfer from the oil sump 84 to the rollbond panel 22e helps to cool the compressor 80. Rollbond panel 22e is formed similarly to the rollbond panels 22a–22c as illustrated in FIG. 3. Rollbond panel 22e includes a fluid passage 86 connected to an inlet 88 and outlet 90, see FIG. 5. Fluid inlet 88 and outlet 90 are each connected to the fluid vessel 46 of energy transfer system 12. It should be noted that each of the inlets 24, 52, and 88 are connected to fluid passage line 92 which runs through the wall 94 of a dwelling. A pump 96 is disposed in line 92 for pumping cooled fluid from heat exchanger 46 through the passages 23 and 50 of rollbond panels 22a–22e. Pump 96 can be provided with variable speeds for increasing or decreasing the mass flow rate of cooling fluid through the fluid passages for controlling the cooling of the refrigerator unit 10. Furthermore, a valve 98 can be provided in fluid line 92 for controlling the fluid flow.

Figure 9:
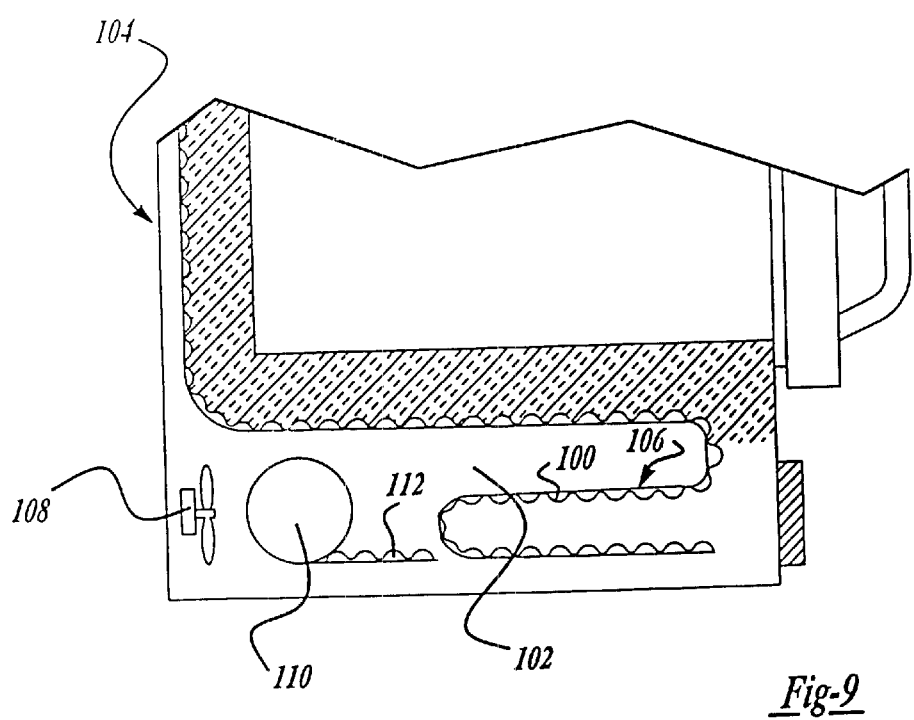
FIG. 9 is a schematic view illustrating alternative methods for cooling the condenser and for cooling the oil in the compressor.

As shown in FIG. 9, the condenser 100 can be disposed in the bottom compartment 102 of the refrigerator 104. The condenser 100 is integrally formed in a roll-bond panel 106. Roll-bond panel 106 is also provided with a cooling fluid passage similarly to the roll-bond panel illustrated in FIG. 6. The roll-bond panel 106 is folded within the bottom compartment 102. A fan 108 is located in the bottom compartment 102 for forced convection cooling of the condenser 100. The compressor 110 is also located in the bottom compartment 102. The compressor 110 is also provided with a roll-bond panel 112 which includes a fluid passage for the cooling oil of the compressor 110 as well as a fluid passage for the cooling fluid from the fluid storage vessel 46. Roll-bond panel 112 is constructed similar to the roll-bond panel illustrated in FIG. 6. Each of the roll-bond panels 106 and 112 are provided with fittings for connecting with fluid passage lines which extend to the external fluid heat exchanger 46. In addition, the condenser 100, which is integrally formed in roll-bond panel 106, is provided with fittings for connection with the refrigerant lines of the refrigeration system. The roll-bond panel 112 is also provided with fittings for attachment to compressor oil lines or an oil sump of the compressor 110.

Figure 7:
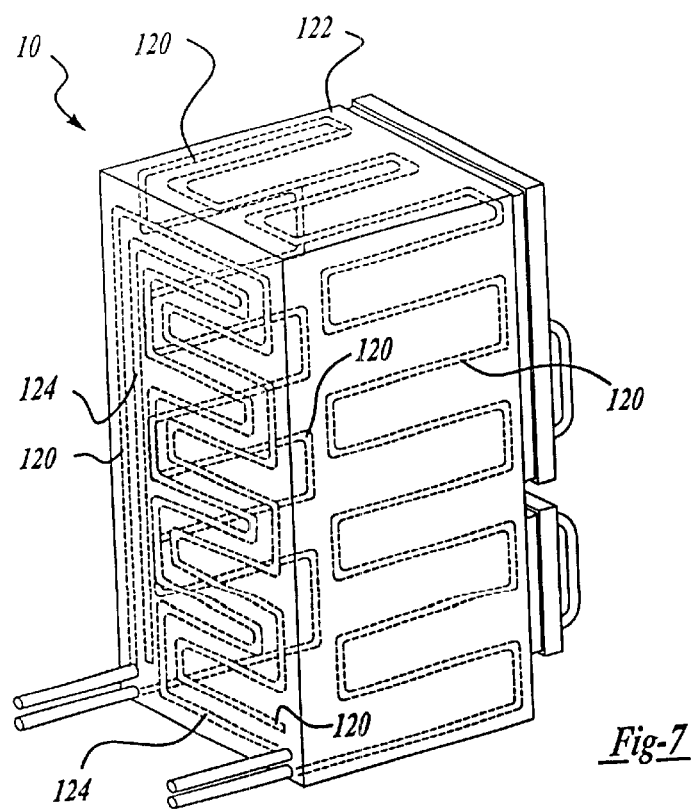
FIG. 7 is a perspective view of a household refrigeration appliance in accordance with the present invention wherein serpentine tubes are disposed in the walls of the housing.
Figure 8:
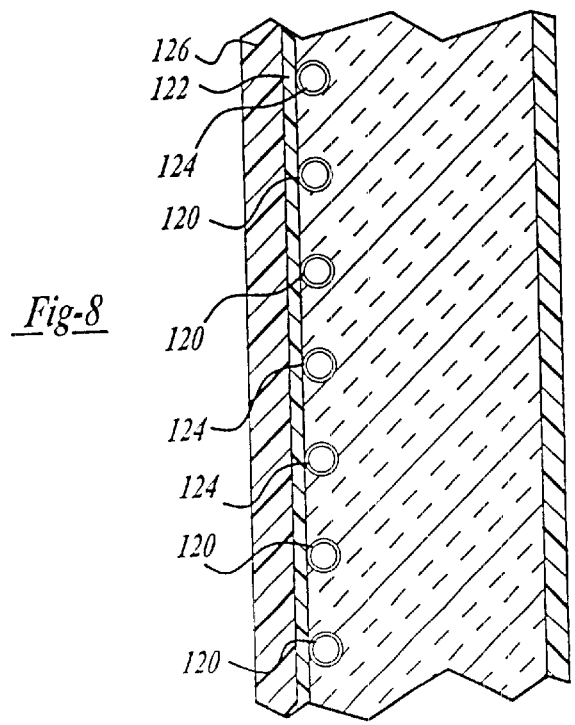
FIG. 8 is a cross-sectional view of a wall of the refrigeration appliance shown in FIG. 7.
Figure 10:
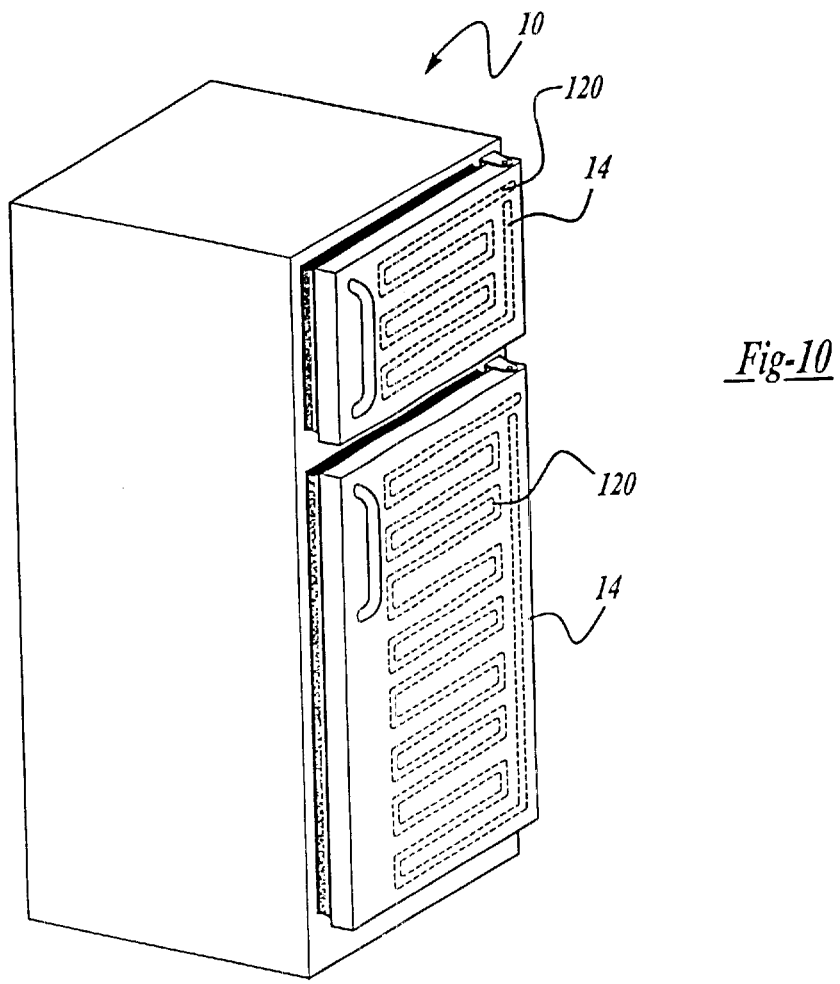
FIG. 10 is a perspective view of a refrigerator illustrating cooling fluid passages disposed on the outer surface of the doors of the refrigerator.
Figure 11:
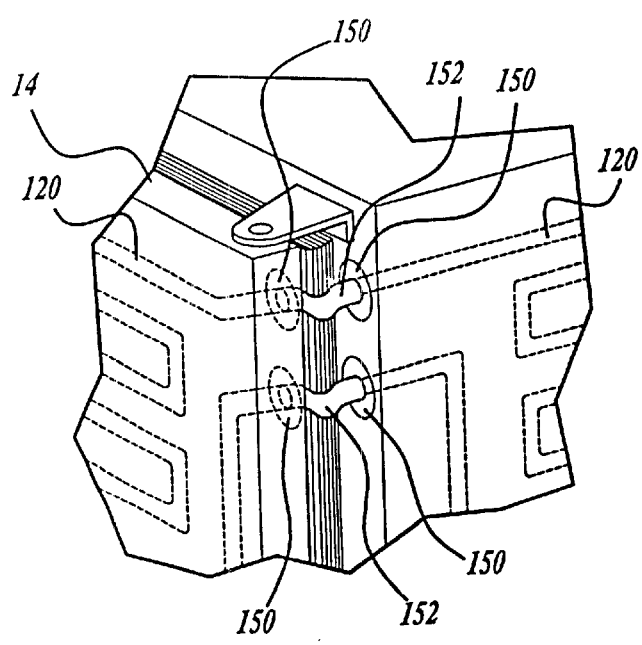
FIG. 11 is a perspective view of the flexible fluid passages connecting the cooling fluid passages in the doors to the main housing of the refrigerator unit.

It should also be noted that the fluid passages through the housing of the refrigerator unit may also be defined by serpentine tubes 120 disposed in a heat exchange relationship within the walls of the housing 122 as shown in FIGS. 7 and 8. The condenser tubes 124 can be provided with a serpentine passage disposed adjacent to be in thermal contact with the serpentine tubes 120. In addition, the fluid passages, such as serpentine tubes 120, can be provided in the doors 14 of the refrigeration appliance 10 as shown in FIGS. 10 and 11. As shown in FIG. 11, the fluid passages 120 disposed in doors 14 are provided with fittings 150 which are connected to a pair of flexible hoses 152. Flexible hoses 152 are connected to fittings 152 for connecting the fluid passages 120 disposed in the doors 14 with the fluid passages 120 disposed in the refrigerator housing 122.

A thin insulating layer 126 is disposed on the outside surface of the refrigerator housing 122, as shown in FIG. 8. The insulating layer 126 can be a plastic exterior or another insulating material such as a thick coat of paint. The insulating layer helps to prevent condensation of atmospheric moisture on the cabinet surface.

As shown in FIG. 1, an appropriate sensor 130 can be provided for reducing the circulation of the cooling fluid when the temperature of the cabinet exterior reaches the dew point of the ambient air. This is to avoid the condensation of atmospheric moisture on the cabinet surfaces. In this case, a controller 132 would be provided which monitors the humidity of the room as well as the temperature of the cabinet as detected by temperature sensor 134. When the temperature of the surface of the cabinet, in the ambient air, approaches the dew point, the controller 132 would reduce the flow rate of pump 96 or shut it off completely if necessary. Although the controller and sensor are shown separate from the refrigerator housing, it should be understood that these may be attached to the housing or contained in a micro-processor assembly.

The fluid used for the energy transfer system 12 according to the present invention can be demineralized water, groundwater, or secondary refrigerants such as food grade glycol or brines, as determined by suitability for the application. Also, the fluid could be groundwater. In several parts of the United States, groundwater wells are sufficiently high enough (e.g., groundwater is close to the surface of the earth) to enable their use.

Figure 12:
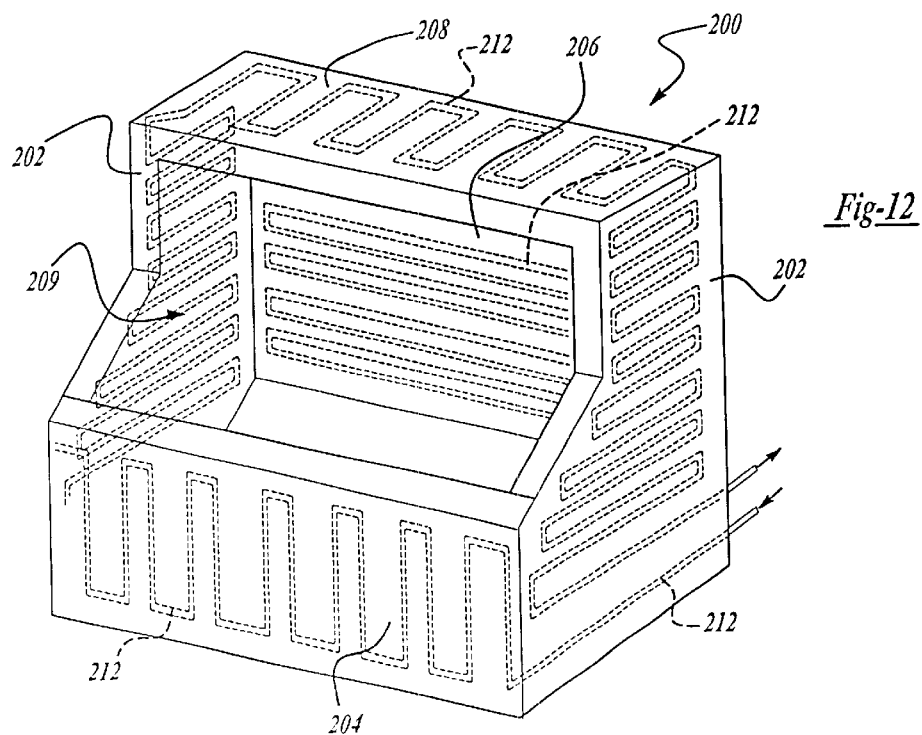
FIG. 12 is a perspective view of an open unit-type commercial refrigeration system having cooling fluid passages disposed in the walls thereof.
Figure 13:
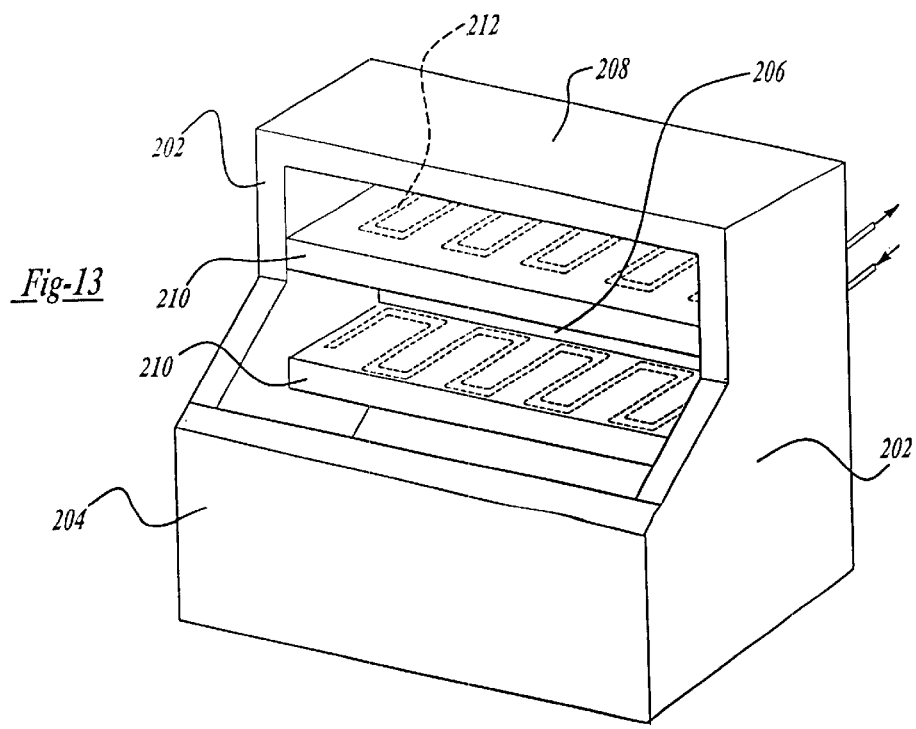
FIG. 13 is a perspective view of an open unit-type commercial refrigeration system having cooling fluid passages disposed in the shelves thereof.

With reference to FIGS. 12–14, 21 and 22, commercial embodiments of the present invention will be described. FIGS. 12 and 13 illustrate an open-type refrigerated case commonly utilized in supermarkets for merchandising perishable foods. The open-type refrigerated cases 200 are typically connected to a refrigeration system having a compressor and condenser with the evaporator typically within the case. The open-type refrigerated case 200 includes a pair of sidewalls 202, a front wall 204, a rear wall 206, and can also be provided with an upper wall 208. The open-type refrigerated case 200 also includes an opening 209 therein. With reference to FIG. 13, the open-type refrigerated case 200 includes a plurality of shelves 210 on which food is displayed. According to the principles of the present invention, the sidewalls 202, front wall 204, rear wall 206, and upper wall 208, as well as shelves 210 are provided with cooling fluid passages for enabling ingress and egress of a cooling fluid circulated through a heat exchanger disposed external of the housing, similarly to the heat exchanger 46 shown in FIG. 1.

In addition, a pump is provided for pumping the cooling fluid through the fluid passages 212 in order to aid in cooling the product storage area in addition to cooling provided by the refrigeration system. The fluid passages 212 disposed in the housing of the open-type refrigerated case 200 can be defined by serpentine tubes or by roll bond panels as shown in FIG. 3.

Figure 14:
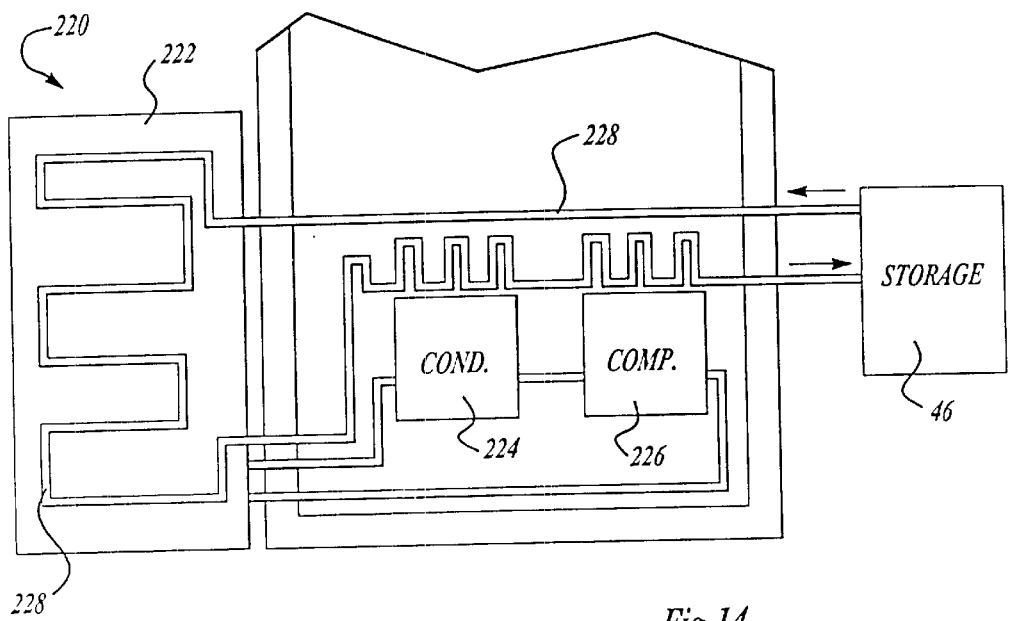
FIG. 14 is a schematic view of a commercial refrigeration system having a compressor and a condenser disposed separate from its refrigerated enclosure unit with the compressor, condenser and unit enclosure each being cooled via cooling fluid passages which circulate fluid received from a naturally cooled heat exchanger.

With reference to FIG. 14, a further embodiment of the present invention is shown in conjunction with a commercial refrigerated case 220. As is common in supermarket refrigeration systems, the condenser 224 and compressor 226 of the refrigeration system are often times remotely located remote from the refrigerated case 220. Typically, this is done for efficient sales area floor space utilization as well as remotely attending to the heat generated by the condensing unit 224, 226. According to the present invention, cooling fluid passages 228 are utilized to cool the walls of the refrigerated case 220 as well as to cool the condenser 224 which is located separate from the refrigerated case 220. In this embodiment, valve 234 is provided for regulating the flow through the cooling passages for the refrigerated case 220 and the condenser 224. Again, the cooling fluid would be circulated through a heat exchanger 46 as discussed with reference to FIG. 1. With each of the embodiments described above, it should be understood that the cooling fluid in the passages aid in cooling the refrigerated case 220 in addition to the cooling provided by the refrigeration system.

Figure 21:
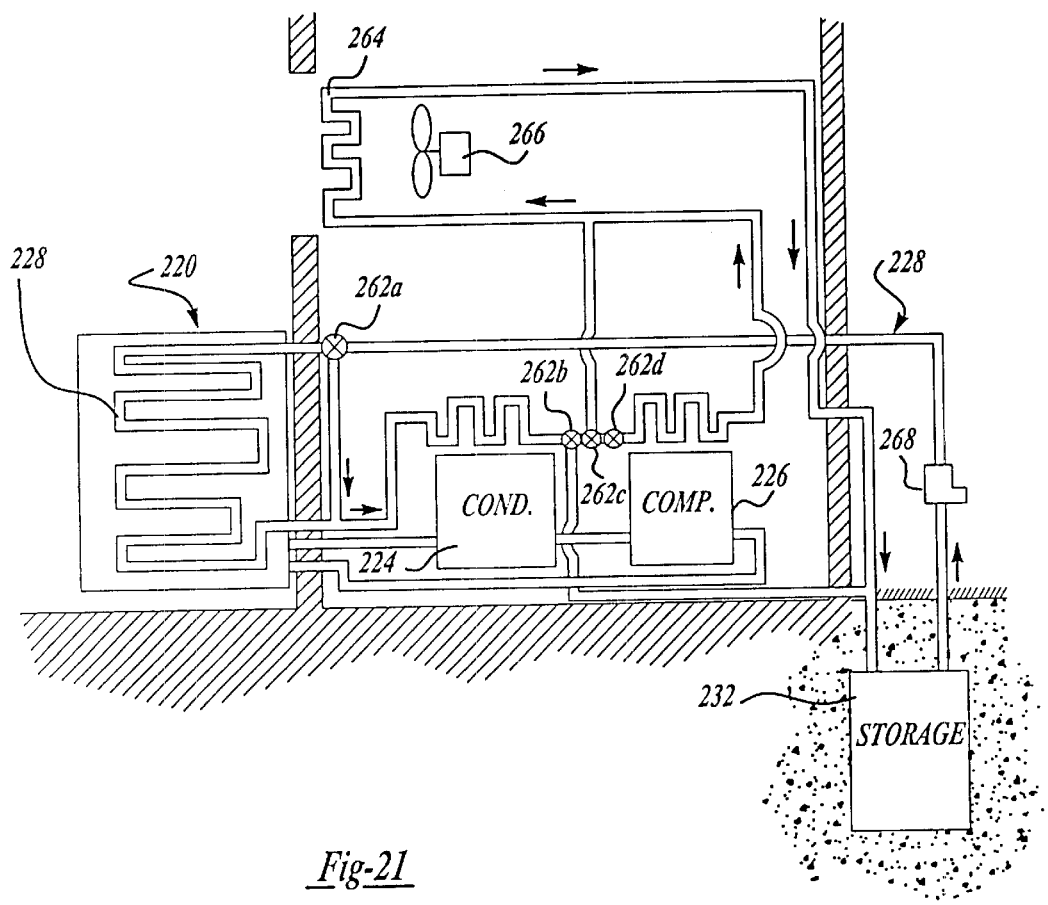
FIG. 21 is a schematic view of a commercial refrigeration system having a compressor and a condenser disposed separate from its refrigerated enclosure unit with the compressor, condenser, and unit enclosure being cooled via cooling fluid passages and the heated cooling fluid being used to augment the heating for a building.

An additional design is shown in FIG. 21 wherein the heated cooling fluid is used to augment the heating for a building. The cooling fluid passages 228 are provided for cooling the refrigerated case 220, condenser 224, and compressor 226 of the refrigeration system. The cooling passages 228 also include a heat exchanger portion 264 for transferring heat to the interior of a building. A fan 266 blows air through the heat exchanger portion 264 as he at from the warmed cooling fluid (such as a glycol solution or other heat transferring fluids) is transferred to the interior of the building. In this embodiment, valves 262a–262d are provided for regulating the flow through the cooling fluid passages for cooling the refrigerated case 220, condenser 224, and the compressor 226 of the refrigeration system.

Valve 262a regulates the fluid path 228 to the refrigerated case 220. Valve 262b regulates the fluid path 228 to the storage 232 to bypass a portion of the flow through the heat exchanger portion 264 to control heating. Valve 262c is used to regulate the fluid path 228 to the heat exchanger portion 264. Valve 262d controls the fluid path 228 to the compressor 226 of the refrigeration system to supply additional heat to the heat exchanger portion 264. The cooling fluid passages 228 are connected to the storage 232. A pump 268 circulates the cooling fluid throughout the cooling fluid passages 228.

In typical grocery store applications, with all the refrigeration that is required, the expense of heating the building is considerable. According to the embodiment shown in FIG. 21, the heat that is absorbed during cooling the refrigerated case 220, condenser 224, and compressor 226 of the refrigeration system can be captured and used for heating the building. Thus, the power required by the heating system is reduced by utilizing heat that is extracted from the refrigeration system.

Figure 22:
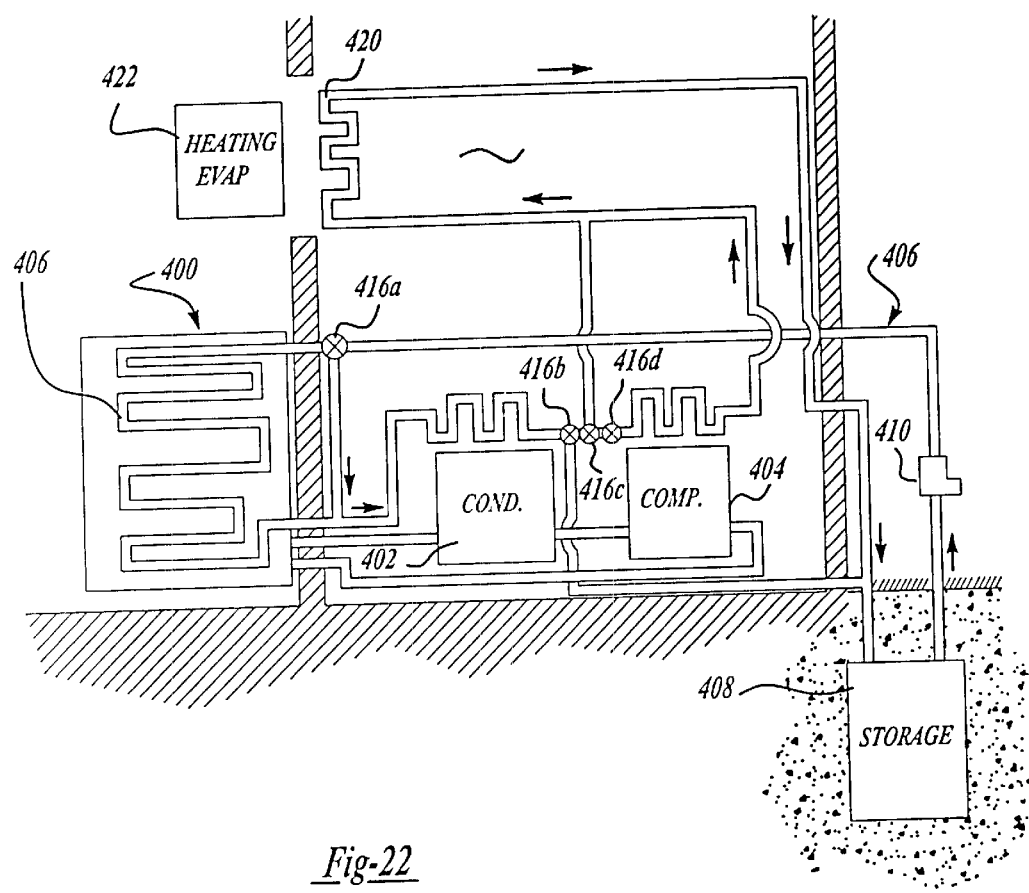
FIG. 22 is a schematic view of a refrigeration system having a compressor and a condenser unit which are cooled via cooling fluid passages which circulate fluid received from a naturally cooled heat exchanger, the warmed fluid is then used for heating the evaporator in a heating system used to heat a building.
Figure 23:
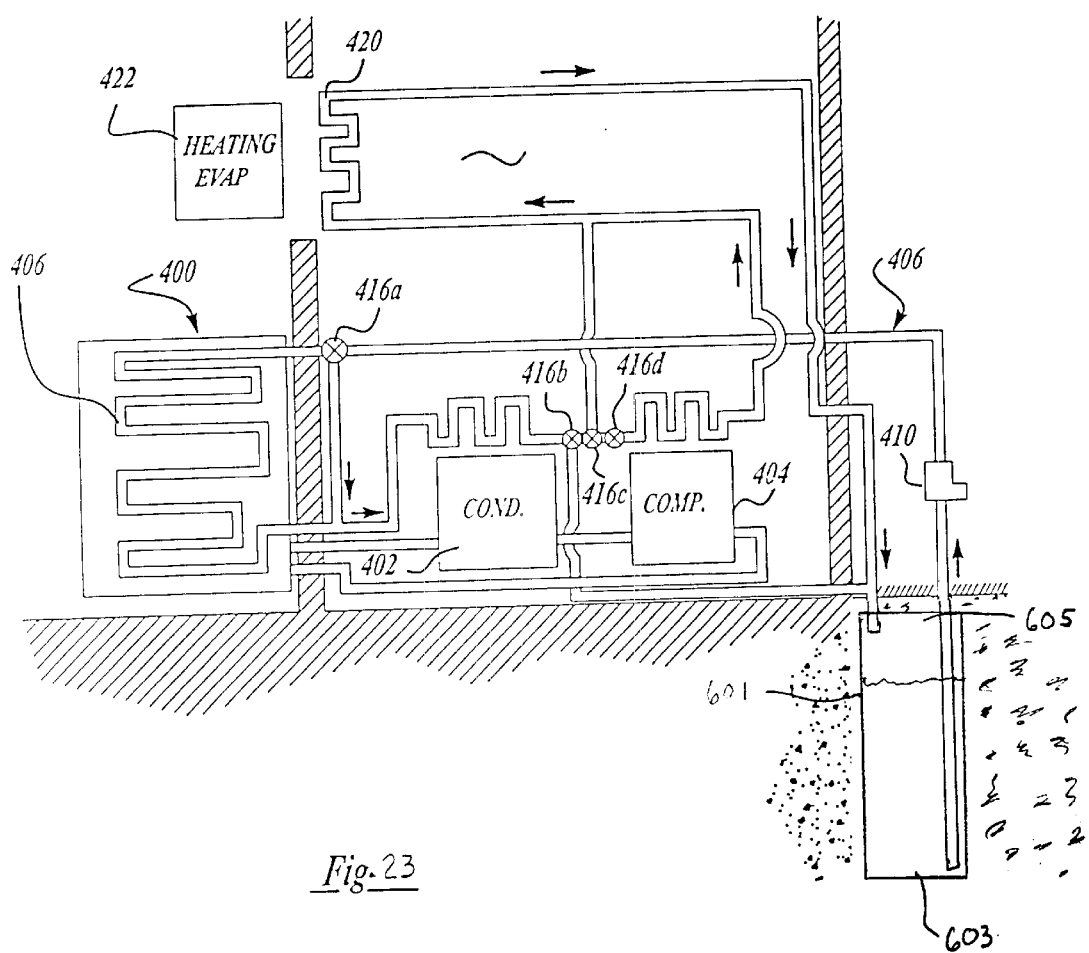
FIG. 23 is a view like FIG. 22 using a groundwater well.

FIG. 22 discloses another embodiment wherein the heated cooling fluid is used to heat the evaporator in a heating system used to heat a building. FIG. 22 shows a refrigerated case 400 having a condenser 402 and a compressor 404 disposed separate from the refrigerated case 400. Cooling fluid passages 406 are utilized to cool the walls of the refrigerated case 400 and condenser 402 and compressor 404 of the refrigeration system. The cooling fluid passages also include a heat exchanger portion 420 for transferring heat to the evaporator 422 of the heating system. As the warmed cooling fluid transfers heat to the heating system evaporator 422, the evaporating temperature is raised, thus reducing the power required by the heating compressor.

In this embodiment, valves 416a–416d are provided for regulating the flow through the cooling fluid passages for cooling the refrigerated case 400, the condenser 402, and the compressor 404 for the refrigeration system. Valve 416a regulates the fluid path 406 to the refrigerated case 400. Valve 416b regulates the fluid path 406 to the storage to bypass a portion of the flow through the heat exchanger portion 420 to control heating. Valve 416c regulates the fluid path 406 to the heat exchanger portion 420. Valve 416d regulates the fluid path 406 to the compressor 404 of the refrigeration system to supply additional heat to the heat exchanger portion 420. The cooling fluid passages are connected to an underground storage 408. A pump 410 circulates the cooling fluid throughout the cooling fluid passages 406.

In each of the above embodiments, the heat exchanger/storage container (46; 232; 408) can be disposed outdoors or underground, or in a basement of the household. When the heat exchanger/storage container (46; 232; 408) is disposed outdoors, the cooler temperatures of the winter months can be taken advantage of for transferring heat away from the refrigerator 10 and its components. However, during the warmer summer months, it would be advantageous to locate the heat exchanger/storage container (46; 232; 408) underground where a constant temperature of approximately 55° F. is maintained. Year-round ground temperatures at depths of 25 feet and lower are essentially constant and typically are at a level equal to the average annual air temperature for the region. In the contiguous United States, these average temperatures range from about 55° F. in the northern sector to about 65° F. in the southern sector. At shallower depths, the ground temperatures are influenced by the seasonal air temperatures and have an annual cyclic swing. At a depth on the order of one to two feet, the ground temperatures typically range from a low of about 30° F. in the winter to a high of about 70° F. in the summer in the northern tier of states. In the southern tier of states, the seasonal range of ground temperatures at that depth is typically 50° F. to 80° F. The ground can be effective in reducing the heat gain through the appliance cabinet walls with a ground-cooling heat exchanger during periods when the soil temperature is lower than the ambient air temperature surrounding the appliance. Therefore, during the peak of the summer, the ground cooling approach may not be as effective. But for the balance of the year, the ground temperature is well below the ambient temperature surrounding the cabinet and the heat gain through the cabinet can be reduced by the energy transfer system. The best performance of the energy transfer system is achieved when the rollbond panels are positioned within the cabinet wall relatively close to the outer wall. They must be positioned at an adequate depth into the insulation to minimize the potential for condensation formation on the outer surface of the cabinet when the cool heat transfer fluid is circulated through the rollbond panel.

When a groundwater well is used in the system, water is drawn from the bottom 603 of the well 601. The water temperature at this part of the well 601 is constant and around 55° F. After the groundwater is circulated through the system, exchanging heat, the groundwater is discharged at the top 605 of the well 601. Thus, this open loop system enables cool groundwater to be drawn at a substantially constant temperature.

Figure 18:
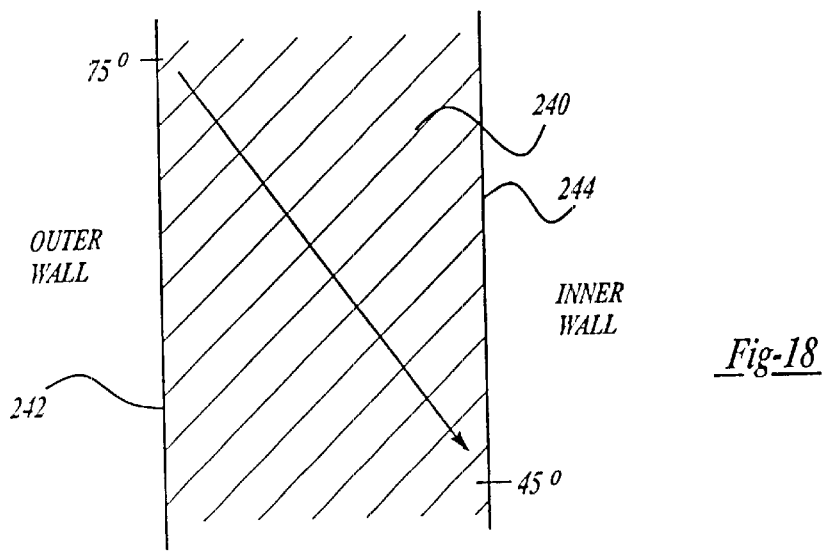
FIG. 18 illustrates a typical temperature profile across a conventional insulated refrigerator wall.

For a cabinet without an energy transfer system, the temperature profile across the insulated wall 240 from the outer wall 242 to the inner wall 244 is linear. This is displayed in FIG. 18.

Figure 19:
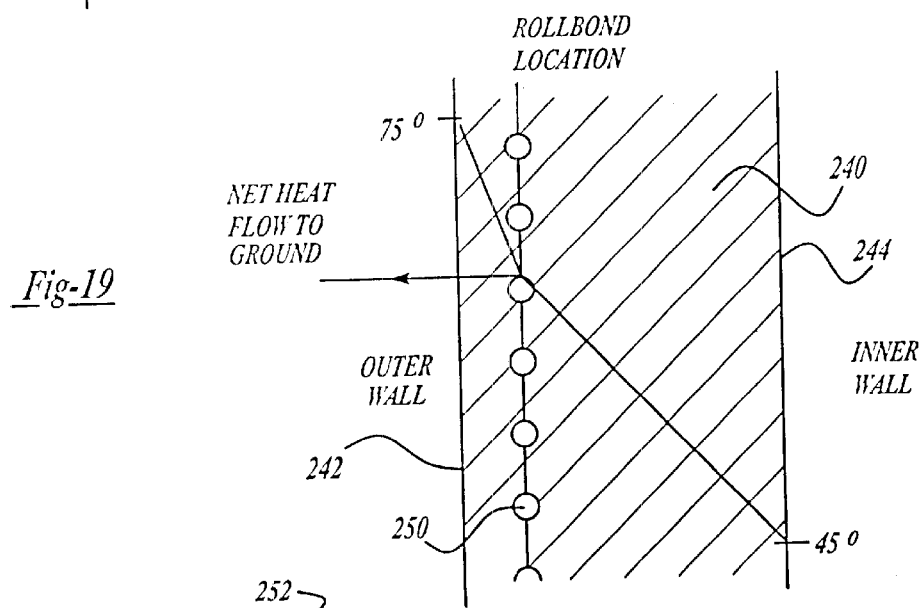
FIG. 19 illustrates a typical temperature profile across an insulated refrigerator wall having fluid passages positioned near the outer wall.

Referring to FIG. 19, a rollbond panel 250 of the energy transfer system is positioned near the outer wall 242 and a heat transfer fluid is circulated through the passages. When the fluid temperature is lower than the outer wall temperature and higher than the inner wall temperature, the temperature profile across the insulation decreases linearly from the outer wall temperature to the rollbond panel temperature at the location of the rollbond panel 250. From the location of the rollbond panel 250 to the inner wall 244 of the cabinet, the temperature decreases linearly at a lower rate per unit of insulation thickness. The heat gain into the cabinet is a direct function of the rate of change of temperature per unit of insulation as indicated by the slope of the temperature profile. A higher amount of heat flows into insulation through the outer wall 242 of the cabinet than flows out from the inner wall 244 into the cabinet. The difference in these heat flows is carried to the heat sink in the ground by the heat transfer fluid flowing through the rollbond panel 250. The closer the rollbond pane l 250 is located to the outer wall 242, the lower the rate of change of temperature between the rollbond panel 250 and the inner wall 244 with a resulting reduction of heat gain through the cabinet walls.

In the northern areas the ground temperatures at a shallow depth, such as one to two feet, can drop below 45EF and be as low as about 30EF. When this occurs, the energy transfer system can reverse the heat flow and thus provide cooling to the fresh food compartment. This reduces or eliminates the need for compressor operation to maintain fresh food compartment temperatures. The best performance of the energy transfer system when these conditions exist is achieved when the rollbond panels are positioned within the cabinet insulation relatively close to the inner wall.

Figure 20:
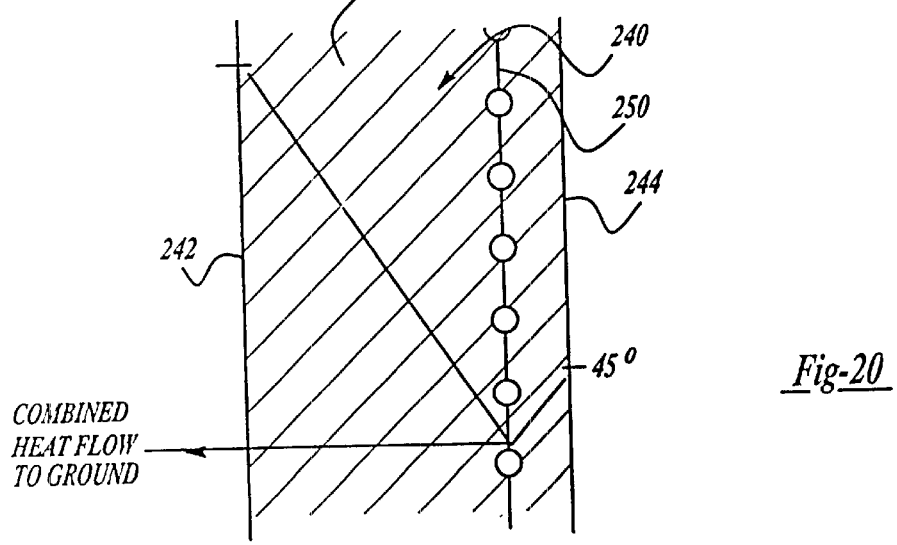
FIG. 20 illustrates a typical temperature profile across an insulated refrigerator wall having fluid passages positioned near the inner wall.

Referring to FIG. 20, the rollbond panel 250 of the energy transfer system is located near the inner wall 244 and a heat transfer fluid is circulated through the rollbond panel at a temperature lower than the inner wall temperature. The temperature profile across the insulation 252 decreases linearly from the outer wall temperature to the rollbond panel temperature at the location of the rollbond panel 250. From the location of the rollbond panel 250 to the inner wall of the cabinet, the temperature profile increases linearly from the rollbond heat transfer fluid temperature to inner wall temperature. For this case, heat flows from both the outer and the inner walls of the cabinet to the rollbond panel 250. The combination of these heat flows is carried to the heat sink in the ground by the heat transfer fluid flowing through the rollbond panels 250. The closer the rollbond panel 250 is located to the inner wall 244, the greater the rate of change of temperature between the rollbond panel 250 and the inner wall 244 and thus the greater the rate of cooling imparted to the fresh food compartment.

Figure 15:
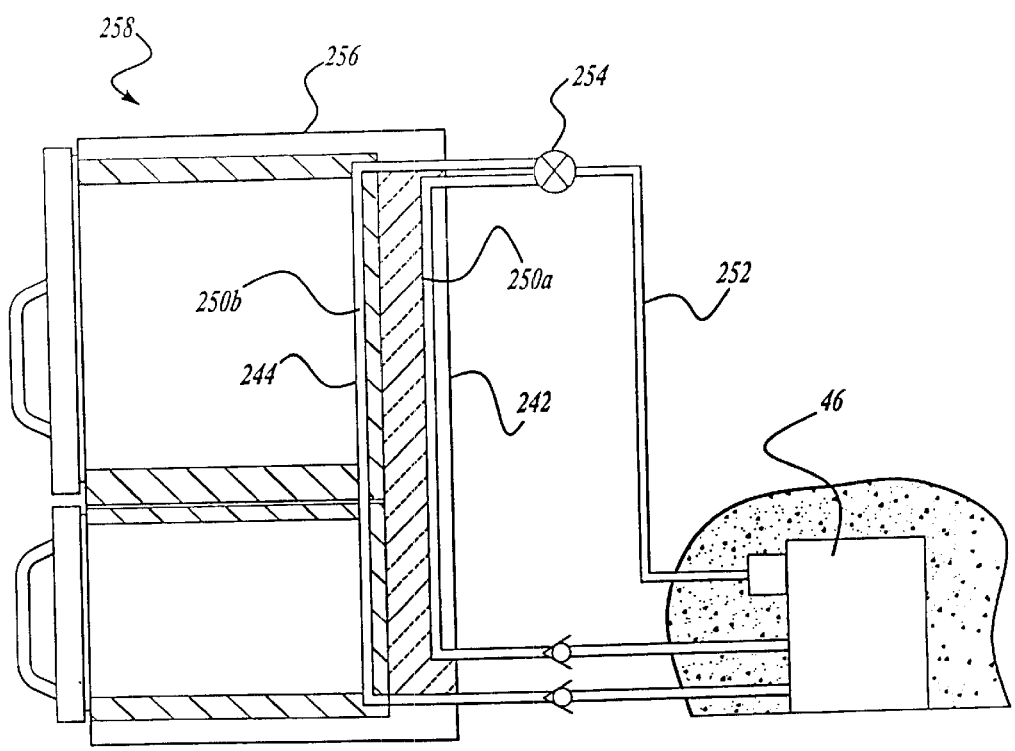
FIG. 15 is a schematic view of another embodiment of the present invention including a fist fluid passage disposed within the housing for providing cooling of the refrigerator housing and a second fluid passage disposed adjacent to the food liner for cooling the food storage compartment using a heat exchanger disposed underground.

For best performance, two sets of rollbond panels 250a, 250b, respectively, can be positioned within the insulation as shown in FIG. 15. One of the panels 250a would be positioned near the outer wall 242 of the cabinet and the other panel 250b would be positioned near the inner wall 244 of the cabinet. During periods when the ground temperature exceeds the storage temperature within the compartment, the heat transfer fluid would be pumped through the panel 250a located closest to the outer wall 242 to optimize the reduction of the heat gain through the cabinet walls. At times when ground temperature drops below the storage temperature of the compartment, the heat transfer fluid would be pumped through the panel 250b located closest to the inner wall 244, negating any heat gain into the interior of the cabinet while also providing cooling to the storage volume.

With reference to FIG. 15, the heat exchanger 46 provides cooled fluid through a passage 252 which connects with a valve 254 which is selectively operable to distribute fluid between two rollbond panels 250a, 250b which extend through the housing 256 of a refrigeration unit 258. The first panel 250a is disposed near the outer wall 242. The second rollbond panel 250b is disposed near the inner wall 24.

The valve system 254 of the present invention allows the selection between a shut-off position for operation in the conventional refrigeration mode when the fluid cooling system is not utilized; a first position for supplying cooling fluid to the first rollbond panel 250a; and a second position for supplying cooling fluid to the second rollbond panel 250b.

Alternatively, a single position for the rollbond panels within the cabinet walls can be selected as shown in FIGS. 19 and 20. The position for the single set of panels would be based on optimizing annual energy savings utilizing seasonal information on ground temperatures. The location for optimum year-round performance would vary by climate.

Figure 16:
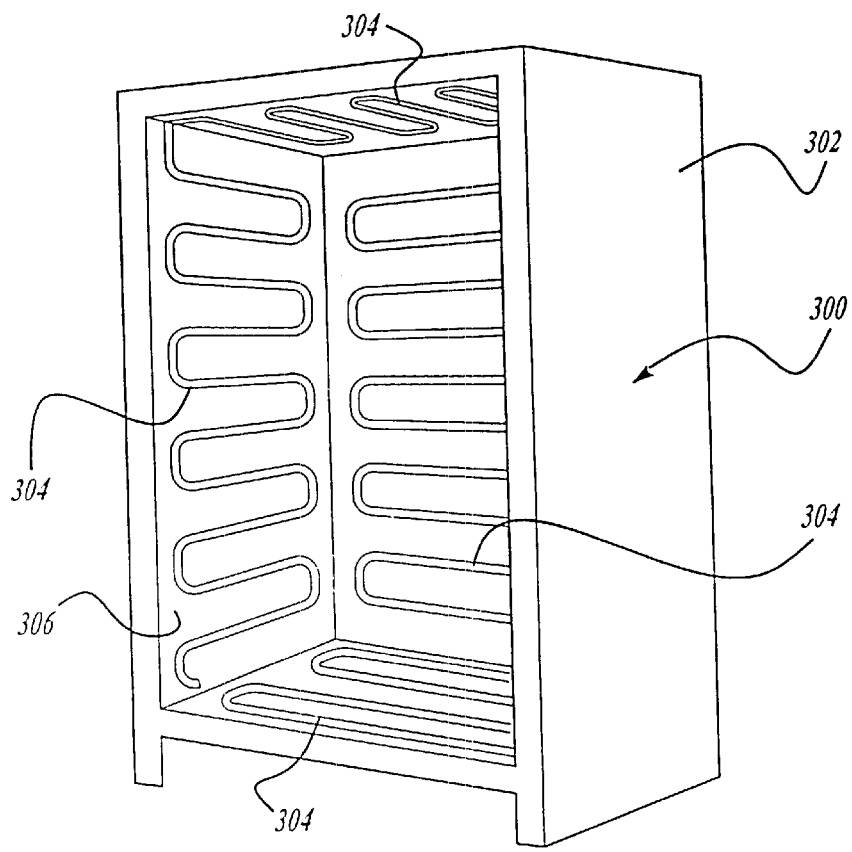
FIG. 16 illustrates a refrigerator cabinet fabricated by injection molding with grooves molded into the inner surface for the passage of heat exchange fluid.
Figure 17:
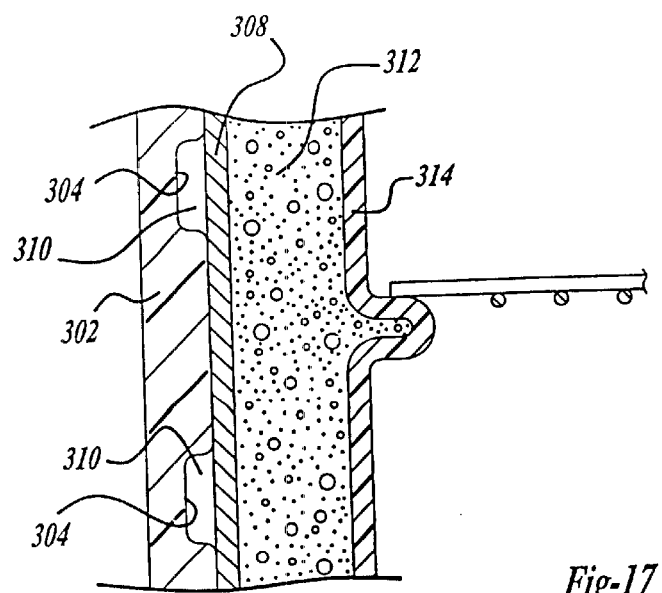
FIG. 17 is a cross-sectional view of the cabinet wall formed according to the process illustrated by FIG. 16, with the food liner foamed in place.

With reference to FIG. 16, a refrigerator cabinet 300 which is fabricated by injection molding the outer shell 302 of a suitable plastic material. The thickness of the shell 302 is approximately in the one-quarter to one-half inch range, presenting sufficient thermal resistance to prevent the condensation of atmospheric moisture on the exposed surfaces under the normal operating conditions. It should be understood that the shell thickness can vary depending upon the materials used and other environmental conditions. As shown in FIG. 16, grooves 304 are molded into the inner surface 306 of the shell 302 for the passage of the heat exchange fluid. Prior to the foaming of the cabinet 300, foil or a sheathing of aluminum or similar heat conducting material 308 is bonded to the inner surface 306, thus forming the enclosed conduits 310 for the passage of the fluid. Foam insulation material 312 is injected between the foil or sheathing 308 and the food liner 314 as shown in FIG. 17.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A refrigeration system, comprising:

a housing defining a cooling storage compartment;

refrigeration means for cooling said cooling storage compartment, said refrigeration means having components including a compressor and a condenser;

a cooling passage for carrying cooling fluid for cooling at least one component of said refrigeration means;

a groundwater source containing said cooling fluid, said cooling passage being connected to said groundwater source;

means for moving said cooling fluid through said at least one fluid passage in order to cool said at least one component of the refrigeration means;

a heat exchanger disposed in said cooling passage for transferring heat from said cooling fluid to an interior of a building by means of a fan blowing air at said heat exchanger.

2. The refrigeration system according to claim 1, wherein said groundwater source is a well.

3. The refrigeration system according to claim 2, wherein said cooling fluid is drawn from said well underground and is at a desired temperature.

4. The refrigeration system according to claim 3, wherein said cooling fluid is discharged at a top of said well.

5. The refrigeration system according to claim 4, wherein said well is an open loop system.

6. A refrigeration system, comprising:

a housing defining a cooling storage compartment;

refrigeration means for cooling said cooling storage compartment, said refrigeration means having components including a compressor and a condenser;

a cooling passage for carrying cooling fluid for cooling at least one component of said refrigeration means;

a groundwater source for providing said cooling fluid to said cooling passage;

means for moving said cooling fluid through said at least one fluid passage in order to cool said at least one component of the refrigeration means.

* * * * *